United States Patent
Benitez et al.

(10) Patent No.: US 9,436,595 B1
(45) Date of Patent: Sep. 6, 2016

(54) USE OF APPLICATION DATA AND GARBAGE-COLLECTED DATA TO IMPROVE WRITE EFFICIENCY OF A DATA STORAGE DEVICE

(71) Applicant: Google Inc., Mountain View, CA (US)

(72) Inventors: Manuel Enrique Benitez, Cupertino, CA (US); Monish Shah, Dublin, CA (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 13/840,838

(22) Filed: Mar. 15, 2013

(51) Int. Cl.
*G06F 12/02* (2006.01)

(52) U.S. Cl.
CPC .................................. *G06F 12/0246* (2013.01)

(58) Field of Classification Search
None
See application file for complete search history.

(56) References Cited

U.S. PATENT DOCUMENTS

| | | | |
|---|---|---|---|
| 8,447,918 B2 | 5/2013 | Sprinkle et al. | |
| 8,898,410 B1 | 11/2014 | Ehrenberg | |
| 2005/0223141 A1* | 10/2005 | Seto et al. | 710/57 |
| 2006/0069850 A1* | 3/2006 | Rudelic | 711/103 |
| 2006/0161724 A1* | 7/2006 | Bennett et al. | 711/103 |
| 2008/0086619 A1* | 4/2008 | Traister et al. | 711/170 |
| 2010/0287217 A1* | 11/2010 | Borchers et al. | 711/103 |
| 2011/0055458 A1* | 3/2011 | Kuehne | 711/103 |

OTHER PUBLICATIONS

"Garbage Collection and TRIM in SSDs Explained" on SSDReview. Posted by Les Tokar on Apr. 16, 2012. Also available at <http://www.thessdreview.com/daily-news/latest-buzz/garbage-collection-and-trim-in-ssds-explained-an-ssd-primer/>.*
"Garbage Collection in Single-Level Cell NAND Flash Memory", Micron Technology, Inc., TN-2960, 2011, 4 pages.

* cited by examiner

*Primary Examiner* — Midys Rojas
*Assistant Examiner* — Jane Wei
(74) *Attorney, Agent, or Firm* — Brake Hughes Bellermann LLP (57) ABSTRACT

A data storage device includes a plurality of flash memory devices. A memory controller is configured to receive a request from a host computing device to write a first logical block of application data to the data storage device, write the first logical block to a data buffer, wherein a size of the data buffer is larger than the logical block and may store multiple logical blocks, write one or more logical blocks of garbage-collected data to the data buffer, and write the logical blocks in the data buffer to the data storage device when the data buffer becomes full. The data buffer written to the data storage device includes at least one logical block of application data and at least one logical block of garbage-collected data. In an alternative implementation, garbage-collected data may be written to the data buffer upon expiration of a timer.

27 Claims, 4 Drawing Sheets

USE OF APPLICATION DATA AND GARBAGE-COLLECTED DATA TO IMPROVE WRITE EFFICIENCY OF A DATA STORAGE DEVICE

TECHNICAL FIELD

This description relates to use of application data and garbage-collected data to improve write efficiency of a data storage device.

BACKGROUND

Data storage devices may be used to store data. A data storage device may be used with a computing device to provide for the data storage needs of the computing device. In certain instances, it may be desirable to improve the write efficiency of the data storage device.

SUMMARY

In some cases, there may be a mis-match in the sizes of a logical block (or logical sector) written by applications, and a page, which is the size of data written to flash memory devices. A page is typically larger than a logical block (or logical sector). This mis-match in sizes between the logical block size and page size can, at least in some instances, create inefficiencies in writing a logical block to a data storage device. According to an example implementation, to assist in addressing the mis-match in sizes between logical blocks and pages, one or more data buffers may be provided where multiple logical blocks may be temporarily stored or buffered in each data buffer. For example, a data buffer may be provided that is the same size of a page to allow multiple logical blocks to be temporarily stored or buffered in the data buffer before being written to a free page in an erase unit.

According to an example implementation, a memory controller of the data storage device receives a request from a host computing device to write a first logical block of application data to the data storage device. The memory controller writes the first logical block of application data to a data buffer. The size of the data buffer is larger than the logical block and may store multiple logical blocks. The memory controller also writes one or more logical blocks of garbage-collected data to the data buffer, e.g., to create a full or fuller data buffer. The memory controller then writes the logical blocks in the data buffer to the data storage device when the data buffer becomes full. The data buffer written to the data storage device includes at least one logical block of application data and at least one logical block of garbage-collected data. In this manner, write efficiency may be improved by combining or integrating both application data and garbage-collected data via a data buffer, before writing this data to the data storage device.

In another example implementation, a timer may be started when a logical block of application data is written to the data buffer. If the timer expires before the data buffer is full, then garbage-collected data, as an additional source of data, may be written to the associated data buffer, e.g., so that the data buffer is full or at least fuller. The full (or at least fuller) data buffer is then written as a page to an erase unit.

In yet another example implementation, garbage-collected data may also be written to a data buffer if an application sends a flush command. For example, any timers associated with data buffers that are storing data from the application that issued the flush command may be expired upon receipt of the flush command. Garbage-collected data may then be written to such data buffers upon timer expiration, and then the data stored in each of these data buffers, including both application data and garbage-collected data, may be written as a page.

According to one general aspect, a method includes receiving, by a memory controller, a request from a host computing device to write a first logical block of application data to a data storage device, writing, by the memory controller, the first logical block to a data buffer, wherein a size of the data buffer is a same size as a page that can be written to the data storage device and is larger than the logical block. The method also includes starting a timer, detecting an expiration of the timer when the data buffer is not full, and writing, by the memory controller, in response to detecting the expiration of the timer, one or more logical blocks of garbage-collected data to the data buffer to fill the data buffer, and writing the full data buffer to the data storage device.

Implementations may include one or more of the following features. For example, the data buffer may include a plurality of logical blocks, and the full data buffer includes at least one logical block of the application data and at least one logical block of garbage-collected data. Also, the garbage-collected data may include at least one valid logical block of an erase unit of the data storage device that has been selected for garbage collection.

In another example, the method may further include tracking, by a garbage collection control engine, a number of valid and invalid logical blocks in each of a plurality of erase units of the data storage device, selecting one of the erase units for garbage collection based on a number of valid logical blocks and a number of invalid logical blocks within the selected erase unit. Also, the writing one or more logical blocks of garbage-collected data may include writing, by the memory controller, in response to detecting the expiration of the timer, one or more of the valid logical blocks of the selected erase unit to the data buffer.

In another example, the method may further include determining a number of free erase units within the data storage device, determining that the number of free erase units is less than a threshold, and increasing a portion of the data buffer that is reserved for the garbage-collected data based on the determining that the number of free erase units is less than a threshold.

In another example, the method may further include determining a number of free erase units within the data storage device, determining that the number of free erase units is greater than a threshold, and decreasing a portion of the data buffer that is reserved for the garbage-collected data based on the determining that the number of free erase units is greater than a threshold.

In another example, the method may further include determining a number of write requests for application data, determining that the number of write requests is greater than a threshold, and decreasing a portion of the data buffer that is reserved for the garbage-collected data based on the determining that the number of write requests is greater than a threshold. In another example, in the method, the receiving may include receiving, by a memory controller, a request from an application running on a host computing device to write a first logical block of application data to a data storage device. The timer may be associated with the application. And, the starting may include starting the timer associated with the application in response to the writing, by the memory controller, the first logical block of data from the application to a data buffer associated with the timer. The method may also include adjusting an initial value of the timer as write requests for application data from the host computing device change or a number of free erase units change in order to vary a likely amount of garbage-collected data that will be written to the data buffer.

In another general aspect, a data storage device includes a plurality of flash memory devices. Each of the flash memory devices is arranged into a plurality of erase units having a plurality of logical blocks for storing data. A memory controller is operationally coupled with the flash memory devices. The memory controller is configured to receive a request from a host computing device to write a first logical block of application data to the data storage device and write the first logical block to a data buffer. A size of the data buffer is a same size as a page that can be written to the data storage device and is larger than the logical block. The memory controller is also configured to start a timer, detect an expiration of the timer when the data buffer is not full, write, in response to detecting the expiration of the timer, one or more logical blocks of garbage-collected data to the data buffer, and write the data buffer to the data storage device.

Implementations may include one or more of the following features. For example, the data buffer may include a plurality of logical blocks. The data buffer includes at least one logical block of the application data and at least one logical block of garbage-collected data, and the garbage-collected data includes at least one valid logical block of an erase unit of the data storage device that has been selected for garbage collection.

In another example, the memory controller is further configured to track a number of valid and invalid logical blocks in each of a plurality of erase units of the data storage device, and select one of the erase units for garbage collection based on a number of valid logical blocks and a number of invalid logical blocks within the selected erase unit. Also, the memory controller being configured to write one or more logical blocks of garbage-collected data may include the memory controller being configured to write, in response to detecting the expiration of the timer, one or more of the valid logical blocks of the selected erase unit to the data buffer.

In another example, the memory controller is further configured to determine a number of free erase units within the data storage device, determine that the number of free erase units is less than a threshold, and increase a portion of the data buffer that is reserved for the garbage-collected data based on the determining that the number of free erase units is less than a threshold.

In another example, the memory controller is further configured to determine a number of free erase units within the data storage device, determine that the number of free erase units is greater than a threshold, and decrease a portion of the data buffer that is reserved for the garbage-collected data based on the determining that the number of free erase units is greater than a threshold.

In another example, the memory controller is further configured to determine a number of write requests for application data, determine that the number of write requests is greater than a threshold, and decrease a portion of the data buffer that is reserved for the garbage-collected data based on the determining that the number of write requests is greater than a threshold.

In another example, the memory controller being configured to receive may include the memory controller being configured to receive a request from an application running on a host computing device to write a first logical block of application data to a data storage device. Also, the memory controller being configured to start may include the memory controller being configured to start the timer associated with the application in response to the writing the first logical block of data from the application to the data buffer associated with the timer.

In another example, the data buffer that is written to the data storage device may include a full data buffer that includes at least one logical block of application data and at least one logical block of garbage-collected data.

In another general aspect, a computer-readable storage medium is provided that stores instructions that when executed cause a processor to perform a process. The process includes receiving a request from a host computing device to write a first logical block of application data to the data storage device and writing the first logical block to a data buffer. A size of the data buffer may be a same size as a page that can be written to the data storage device and is larger than the logical block. The process also includes starting a timer, detecting an expiration of the timer when the data buffer is not full, writing, in response to detecting the expiration of the timer, one or more logical blocks of garbage-collected data to the data buffer, and writing the data buffer to the data storage device.

Implementations may include one or more of the following features. For example, the data buffer that is written to the data storage device may include a full data buffer that includes at least one logical block of application data and at least one logical block of garbage-collected data.

For example, the data buffer may include a plurality of logical blocks, and the data buffer that is written to the data storage device is full and may include at least one logical block of the application data and at least one logical block of garbage-collected data. The garbage-collected data may include at least one valid logical block of an erase unit of the data storage device that has been selected for garbage collection.

In another example, the process may further include tracking a number of valid and invalid logical blocks in each of a plurality of erase units of the data storage device and selecting one of the erase units for garbage collection based on a number of valid logical blocks and a number of invalid logical blocks within the selected erase unit. Also, the writing one or more logical blocks of garbage-collected data may include writing, in response to detecting the expiration of the timer, one or more of the valid logical blocks of the selected erase unit to the data buffer.

In another example, the process may further include determining a number of free erase units within the data storage device, determining that the number of free erase units is less than a threshold, and increasing a portion of the data buffer that is reserved for the garbage-collected data based on the determining that the number of free erase units is less than a threshold.

In another general aspect, an apparatus may include means for receiving, by a memory controller, a request from a host computing device to write a first logical block of application data to a data storage device, means for writing, by the memory controller, the first logical block to a data buffer, wherein a size of the data buffer is a same size as a page that can be written to the data storage device and is larger than the logical block. The apparatus also includes means for starting a timer, means for detecting an expiration of the timer when the data buffer is not full, and means for writing, by the memory controller, in response to detecting the expiration of the timer, one or more logical blocks of garbage-collected data to the data buffer to fill the data buffer, and means for writing the full data buffer to the data storage device.

Implementations may include one or more of the following features. For example, the apparatus may further include means for tracking, by a garbage collection control engine, a number of valid and invalid logical blocks in each of a plurality of erase units of the data storage device, means for selecting one of the erase units for garbage collection based on a number of valid logical blocks and a number of invalid logical blocks within the selected erase unit. Also, the menas for writing one or more logical blocks of garbage-collected data may include means for writing, by the memory controller, in response to detecting the expiration of the timer, one or more of the valid logical blocks of the selected erase unit to the data buffer.

In another example, the apparatus may further include means for determining a number of free erase units within the data storage device, means for determining that the number of free erase units is less than a threshold, and means for increasing a portion of the data buffer that is reserved for the garbage-collected data based on the determining that the number of free erase units is less than a threshold.

In another example, the apparatus may further include means for determining a number of free erase units within the data storage device, means for determining that the number of free erase units is greater than a threshold, and means for decreasing a portion of the data buffer that is reserved for the garbage-collected data based on the determining that the number of free erase units is greater than a threshold.

In another example, the apparatus may further include means for determining a number of write requests for application data, means for determining that the number of write requests is greater than a threshold, and means for decreasing a portion of the data buffer that is reserved for the garbage-collected data based on the determining that the number of write requests is greater than a threshold.

In another example, in the apparatus, the means for receiving may include means for receiving, by a memory controller, a request from an application running on a host computing device to write a first logical block of application data to a data storage device. The timer may be associated with the application. And, the means for starting may include means for starting (e.g., the memory controller) the timer associated with the application in response to the writing, by the memory controller, the first logical block of data from the application to a data buffer associated with the timer.

In another general aspect, a data storage device includes a plurality of flash memory devices. Each of the flash memory devices is arranged into a plurality of erase units having a plurality of logical blocks for storing data. A memory controller is operationally coupled with the flash memory devices. The memory controller is configured to receive a request from a host computing device to write a first logical block of application data to the data storage device, write the first logical block to a data buffer, wherein a size of the data buffer is larger than the logical block and may store multiple logical blocks, write one or more logical blocks of garbage-collected data to the data buffer, and write the logical blocks in the data buffer to the data storage device when the data buffer becomes full. The data buffer written to the data storage device includes at least one logical block of application data and at least one logical block of garbage-collected data.

Implementations may include one or more of the following features. For example, the memory controller may be further configured to start a timer when the first logical block is written to the data buffer. The memory controller being configured to write one or more logical blocks of garbage-collected data may include the memory controller being configured to write one or more logical blocks of garbage-collected data to the data buffer if the timer expires and the data buffer is non-full.

In another example, the garbage-collected data may include one or more valid logical blocks of one or more erase units selected for garbage collection.

In another example, at least a portion of the data buffer is reserved for garbage-collected data. In another example, the portion of the data buffer that is reserved for garbage collection is variable based on a number of free erase units in the data storage device. In another example, at least a portion of the data buffer is reserved for application or host data. In another example, at least a first portion of the data buffer is reserved for garbage-collected data, at least a second portion of of the data buffer is reserved for application data, and the sizes of the first portion and the second portion are adjusted based on a number of free erase units in the data storage device.

In another general aspect, a method may include receiving a request by a memory controller from a host computing device to write a first logical block of application data to the data storage device, writing the first logical block to a data buffer, wherein a size of the data buffer is larger than the logical block and may store multiple logical blocks, writing one or more logical blocks of garbage-collected data to the data buffer and writing, by the memory controller, the logical blocks in the data buffer to the data storage device when the data buffer becomes full. The data buffer written to the data storage device includes at least one logical block of application data and at least one logical block of garbage-collected data.

In another general aspect, an apparatus may include means for receiving a request by a memory controller from a host computing device to write a first logical block of application data to the data storage device, means for writing the first logical block to a data buffer, wherein a size of the data buffer is larger than the logical block and may store multiple logical blocks, means for writing one or more logical blocks of garbage-collected data to the data buffer and means for writing, by the memory controller, the logical blocks in the data buffer to the data storage device when the data buffer becomes full. The data buffer written to the data storage device includes at least one logical block of application data and at least one logical block of garbage-collected data.

The details of one or more implementations are set forth in the accompanying drawings and the description below. Other features will be apparent from the description and drawings, and from the claims.

DETAILED DESCRIPTION

This document describes systems and techniques to use application data and garbage-collected data to improve write efficiency of a data storage device in conjunction with a host computing device. The data storage device may include a memory controller and multiple memory devices. The multiple memory devices may be any type of memory device, as discussed in more detail below, including multiple flash memory devices. The host computing device may include one or more applications that send memory operation commands, such as memory write commands, for execution by the memory controller of the data storage device.

A garbage collection process may be used to free memory space on the flash-based data storage device so that data can be written to the flash memory devices. As part of the garbage collection process, one or more erase units may be selected for garbage collection, e.g., based on a number of invalid logical blocks on the erase unit. As part of the garbage collection process, valid blocks on erase units selected for garbage collection may be written or copied to a new device or a new erase unit, to allow the selected erase unit to be erased.

Cells of memory devices are organized into erase units and each erase unit includes a plurality of pages. Each page may include a plurality of logical blocks, for example. Data can be written to and read from a memory device in pages, but when data is erased from a memory device, it is erased in erase units. Furthermore, according to an example implementation, one or more applications may write data to the data storage device in logical blocks (which may also be referred to as logical sectors), where a logical block may be smaller than a page. Thus, there may be a mis-match in the sizes of the logical block (or logical sector) written by applications, and pages, which is the size of data written to flash memory devices. This mis-match in sizes between the logical block size and page size can, at least in some instances, create inefficiencies in writing a logical block to the data storage device.

According to an example implementation, to assist in addressing the mis-match in sizes between logical blocks and pages, one or more data buffers may be provided where multiple logical blocks may be temporarily stored or buffered in each data buffer. For example, a data buffer may be provided that is the same size of a page to allow multiple logical blocks to be temporarily stored or buffered in the data buffer before being written to a free page in an erase unit.

According to an example implementation, the memory controller receives a request from a host computing device to write a first logical block of application data to the data storage device. The memory controller writes the first logical block to a data buffer. The size of the data buffer is larger than the logical block and may store multiple logical blocks. The memory controller writes one or more logical blocks of garbage-collected data to the data buffer, e.g., to create a full or fuller data buffer. The memory controller then writes the logical blocks in the data buffer to the data storage device when the data buffer becomes full. The data buffer written to the data storage device includes at least one logical block of application data and at least one logical block of garbage-collected data. In this manner, write efficiency may be improved by combining or integrating both application data and garbage-collected data via a data buffer, before writing this data to the data storage device.

According to another example implementation, a logical block(s) may be written to the data buffer in response to memory write commands received by the memory controller from an application or host computing device. A timer may be provided and set to an initial value to prevent data from being stored too long in the data buffer, as this may increase the risk of data loss, e.g., due to possible loss of power or failure of the data buffer. When a logical block of application data is written to the data buffer, the associated timer may be started. If the data buffer becomes full before the expiration of the timer, e.g., due to multiple logical blocks of application data being written to the data buffer, then the data buffer is written to a page on an erase unit.

If, on the other hand, the timer expires before the data buffer is full, then garbage-collected data, as an additional source of data, may be written to the associated data buffer, e.g., so that the data buffer is full or at least fuller. The full (or at least fuller) data buffer is then written as a page to an erase unit, and may include at least one logical block of application data and at least one logical block of garbage-collected data. In this manner, a data buffer may receive data from two sources: application data from one or more applications or a host computing device, and garbage-collected data, which may include a valid logical block(s) of an erase unit that has been selected for garbage collection. Therefore, write efficiency may be improved by integrating or combining both application data and garbage-collected data in a data buffer that is used for writing data to the data storage device.

Figure 1:
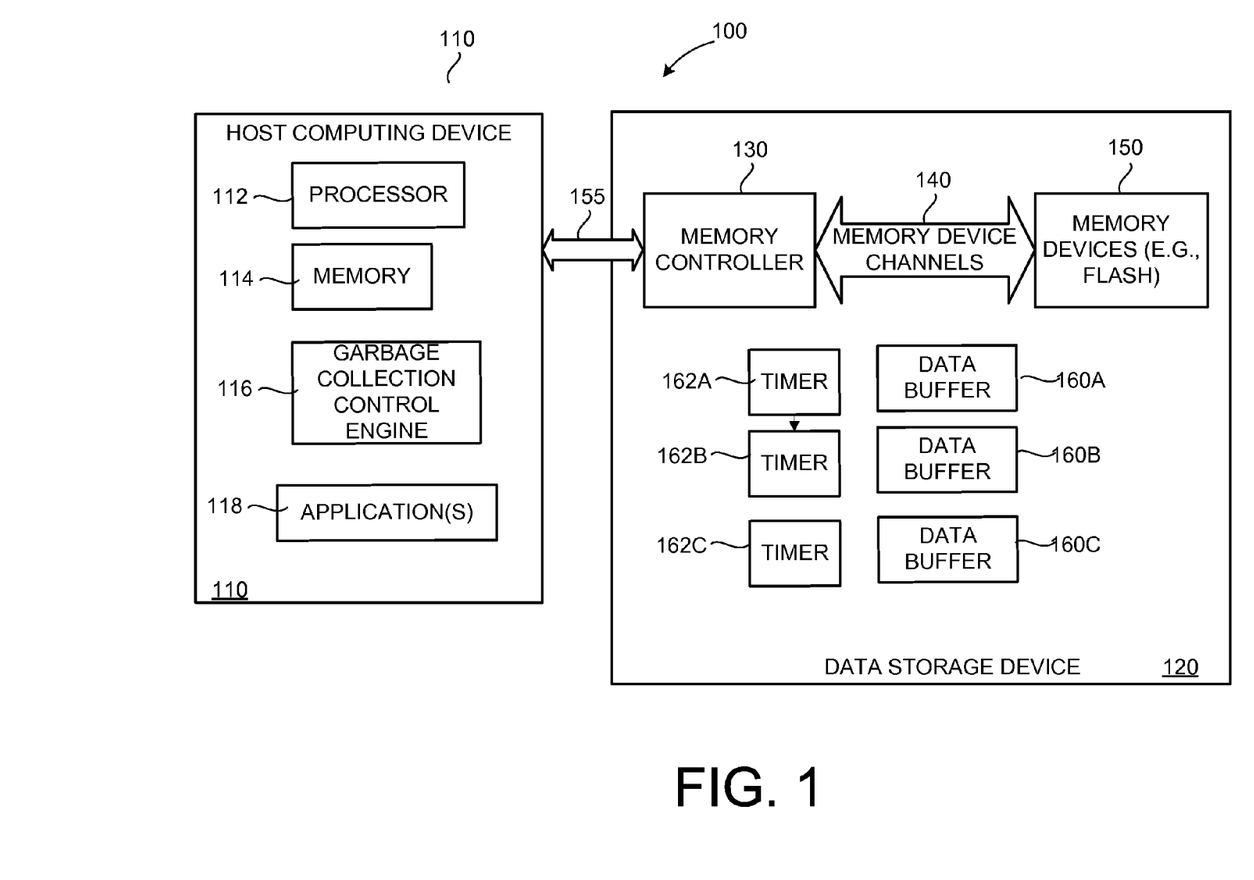
FIG. 1 is a block diagram illustrating a computing system in accordance with an example implementation.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 also may take a number of forms. The data storage device 120 may be implemented as a number of appropriate devices that may work in conjunction with a host device (e.g., the host device 110) to store and/or retrieve electronic data. For instance, the data storage device may be a solid state drive (SSD) (e.g., a flash memory based SSD), a magnetic disk drive or an optical disk drive, as some examples.

The host computing device 110 includes a processor 112 for executing instructions or software, memory for storing data and instructions, a garbage collection control engine for controlling garbage collection operations within computing system 100, and an application(s) 118, which may run or be executed by processor 112, for example.

As shown in FIG. 1, the data storage device 120 includes a memory controller 130, memory device channel interfaces 140 (also referred to as memory device channels) and memory devices 150. The data storage device 120 may also include one or more data buffers 160, such as data buffers 160A, 160B and 160C, although any number of data buffers. The data buffers 160A, 160B and 160C may, for example, be used to temporarily store or buffer data received from host computing device 110 prior to writing such buffered data to memory devices 150 of data storage device 120. The memory devices 150 may be implemented using a number of different types of memory devices. For instance, the memory devices 150 may be implemented using flash memory devices (e.g., NAND flash memory devices), or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain memory operation commands from the host computing device 110. When implementing the data storage device 120 using flash memory devices for the memory devices 150, the memory operation commands (or requests) obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation, memory request and memory command may be used interchangeably to describe machine-readable instructions (e.g., from a host computing device to a data storage device) to execute one or more data storage or memory functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes multiple flash memory devices 150 that are implemented in multiple separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

In one exemplary implementation, the memory controller 130 and other components may be disposed on a printed circuit board and the memory devices 150 may be disposed on one or more other printed circuit boards. The printed circuit boards may be assembled together.

In one exemplary implementation, a high speed link 155 may be used to connect the host computing device 110 and the data storage device 120. The link 155 may be a physical connector or it may be a logical connector. For instance, the link 155 may be a PCI-e link to connect and route signals between the host computing device 110 and the data storage device 120.

An application 118 (or multiple applications) may be provided or running on the host computing device 110. Some applications may perform (or request) write operations to the data storage device 120 in logical blocks, which may be 512 bytes (512B), 4 kilobytes (4 KB), or other data chunk size. Application 118 may request a write operation to the data storage device 120 by, for example, issuing a memory write command to memory controller 130. While the application 118 or host computing device 110 may perform write operations using a logical block (e.g., by application 118 issuing memory write commands to memory controller 130 to write the 4 KB logical block to the flash devices 150), the data storage device 120 may write data to the flash memory devices in chunks of data that are pages (e.g., 16 KB). In other words, according to an example implementation, the smallest chunk of data that can be written to the flash devices 150 of the data storage device 120 may be a page.

In one example implementation, a size of a page used by the data storage device 120 may be larger than the size of the logical block used by the application 118. For example, an application 118 may write logical blocks (e.g., 4 KB logical blocks), while the memory controller 130 of the data storage device 120 may write 16 KB pages to the flash devices. The 4 KB size for a logical block, and the 16 KB page size are merely examples, and other sizes may be used. However, according to an example implementation, the logical block size, used for write operations by the application 118, may be smaller than the page size used for physical write operations by the data storage device 120.

Thus, in one example, in response receiving a memory write command from the application 118 or host computing 110 device to write a 4 KB logical block to the data storage device 120, the memory controller 130 may write a 16 KB page to flash memory devices 150, including the 4 KB logical block, where the other 12 KB of the page may not have actual data, but may simply write ones or zeroes. This write operation, e.g., performing a 16 KB page write operation to write a 4 KB logical block, is very inefficient, due to the mis-match between the logical block size and the page size, and may reduce the operational life of the memory devices 150.

Therefore, according to an example implementation, in order to accommodate this mis-match in data sizes between the logical block used by application 118 and the pages (or write blocks) used by the data storage device 120 and to improve write efficiency, one or more data buffers 160 may be provided on the storage device, such as data buffers 160A, 160B, 160C. Alternatively, the data buffers 160 may be provided on the host computing device 110. According to an example implementation, each of the data buffers 160 may be the same size as the pages used by the storage device (e.g., 16 KB). One or more write requests or memory write commands may be received by the memory controller 130 of the data storage device 120 from the host computing device 110 and/or application 118 (or other applications) to write one or more 4 KB logical blocks to the data storage device 120.

According to one example implementation, a logical write operation may be performed by the memory controller 130 in response to receiving the logical block write request, including writing (or storing) the 4 KB logical block to one of the data buffers 160, and then acknowledging (or sending an acknowledgement) back to the host computing device 110 or application 118 that the write operation was completed. This logical write operation, including writing the logical block to a data buffer 160 and providing a write acknowledgement to the host computing device 110, may be repeated one or more times until a data buffer is full. Thus, for example, when four 4 KB logical blocks have been logically written (e.g., write request received and acknowledged and logical block stored in a data buffer 160), the data (e.g., 16 KB) of this full data buffer 160 may then be physically written by the memory controller 130 as a page to a (e.g., 16 KB) free page within the data storage device 120. According to one example implementation, multiple (or a plurality of) data buffers, such as data buffers 160A, 160B, 160C, may be provided, e.g., in order to accommodate the temporary storage of logical blocks of data during peak activity rates.

However, according to an example implementation, in some cases, a logical write of one or more logical blocks may be performed, and no further data may be received from the application for a period of time. In some cases, this may risk potential loss of the data that has been logically written and stored in the data buffer 160 but not yet physically written to the flash memory devices 150, e.g., in the event of a power failure or DRAM failure, or the like. A risk or possibility of loss of data stored in data buffers 160 increases as the amount of time the data is stored in buffers 160 before being written to data storage device 120 increases.

Therefore, according to an example implementation, a timer 162 may be used to prevent data from being stored in a data buffer too long without being written to the data storage device 120. For example, a timer 162 may be associated with each data buffer 160, and may be set or initialized to an initial value or starting value. For example, timers 162A, 162B and 162C are associated with data buffers 160A, 160B and 160C, respectively. When a logical block of data has been written to a data buffer 160A, the timer 162A associated with that data buffer 160A may be started. If further logical blocks of data are received and stored in that data buffer 160A to cause the data buffer 160A to become full before expiration of the associated timer 162A, then the data in the data buffer 160A is then written by the memory controller 130 to the data storage device 120 as a page, and the associated timer 162A is then reinitialized to the initial value.

However, according to an example implementation, if the timer 162A associated with the data buffer 160A expires (e.g., counts down to zero) before the data buffer 160A becomes full, then garbage-collected data (or data obtained as part of a garbage collection process) may be written (or stored) to the partially full (or non-full) data buffer 160A in order to fill the data buffer 160A, or to provide a data buffer 160A that is at least fuller than with just data from application(s) 118. In this manner, two data streams, or two sources of data (e.g., application data and garbage-collected data) may be merged, combined, or interleaved to fill a data buffer(s) 160 and improve write efficiency and the garbage-collection process. For example, upon expiration of the timer 162A associated with a data buffer 160A, one or more valid logical blocks of data from one or more pages of an erase unit that has been selected for garbage collection are written to the partially full data buffer 160A in order to fill the data buffer. The full data buffer 160A is then written to the flash memory devices 150 of data storage device 120. In this manner, the write efficiency of the system may be improved by using garbage-collected data (e.g., valid logical blocks of data from an erase unit selected for garbage collection) as an additional source of data for the data buffers when writing pages of data to the flash memory devices 150 of the data storage device 120.

The garbage collection control engine 116 can be used to coordinate and control garbage collection operations on the data storage device 120. Garbage collection control engine 116 may include logic, or may be a software program that runs or executes on host computing device 110 or processor 112. Alternatively, although not shown in FIG. 1, garbage collection control engine 116 may be a program that runs on memory controller 130, for example. Cells of memory devices 150 are organized in erase units (or erase blocks) and each erase unit includes a plurality of pages. Each page may include a plurality of logical blocks, for example. Data can be written to and read from a memory device 150 in page-sized units, but when data is erased from a memory device 250, it is to be erased in erase units. In addition, memory devices 150 cannot be updated in-place, that is, data written to a page of a chip cannot be overwritten by new data. Because of these constraints, when updating of data on the data storage device 120 an out-of-place updating scheme must be used in which the new data are written to a different physical location than the old data, and then the old data are declared invalid.

According to an example implementation, logical blocks of memory devices 150 can have one of three states: (1) free (wherein the logical block contains no data and is available to store new or updated data); (2) valid (wherein the logical block contains new or recently updated data that is available to be read); or (3) invalid (wherein the logical block contains obsolete data or data marked for deletion/erase). After some cycles of updating data on a memory device 150 using the out-of-place updating procedure, the number of valid and invalid logical blocks will increase, which reduces the number of free logical blocks available to receive new or updated data.

Therefore, a garbage collection process is used to reclaim logical blocks or pages on a memory device. The garbage collection process eliminates the need to perform erasure of the whole erase unit prior to every page write. The garbage collection process accumulates pages, logical blocks (or other chunks of memory) marked as invalid (or marked for erase) as "garbage" and performs an erasure of an entire erase unit as space reclamation in order to reuse the erase unit.

According to an example implementation, garbage collection control engine 116 performs and/or controls the garbage collection process for data storage device 120. In a garbage collection process, an erase unit is targeted for having all of its data erased, so that the logical blocks or pages of the erase unit can be reclaimed. Before erasing the selected erase unit, the valid logical blocks of the erase unit that has been targeted or selected for garbage collection are copied to a new location into free pages of one or more different erase units or one or more different memory devices 250. After all the valid logical blocks of the targeted erase unit are successfully copied to the new locations, the logical blocks of the selected or targeted erase unit are erased, so that they are free to have data written to them.

Garbage collection is important for using a flash memory device, but garbage collection is also time-consuming. This is because in a flash memory storage device, write operations to a flash memory chip take much longer (e.g., approximately 10 times longer) than read operations from a flash memory chip, and because erase operations take much longer (e.g., approximately 10 times longer) than write operations. Therefore, at least in some cases, write efficiency may be improved to the extent that writing garbage-collected data can be combined with the writing of application data, as described herein.

Garbage collection may be performed, for example, when it is necessary to reclaim free space on a memory chip in order to write new or updated data to the chip. For example, if the chip contains fewer free logical blocks than are necessary to receive the data that is intended to be written to the chip, then garbage collection must be performed to erase enough erase units to reclaim a sufficient number of logical blocks or pages to receive the data to be written to the chip. Alternatively, garbage collection may be performed pre-emptively, e.g., before it is necessary to reclaim free space.

According to an example implementation, garbage collection control engine 116 may continuously perform the garbage collection process as a background process, which may include, for example, marking outdated pages or logical blocks as invalid, selecting (or targeting) one or more erase units for garbage collection, e.g., when more than X % of the logical blocks or pages or more than X logical blocks or pages of the erase unit are invalid (where X is a threshold number), and then copying valid logical blocks to new erase units, and then erasing the selected/targeted erase unit when all valid logical blocks or pages of the erase unit have been copied to another location. Memory controller 130 may also maintain a logical address to physical address map that identifies corresponding physical memory locations/physical addresses for each logical address that is provided by the application 118. This logical address to physical address map is updated to reflect a new physical address/location when data is written to a new physical memory location, for example.

According to an example implementation, two processes including: 1) the use of data buffers to address the mis-match in size between application logical blocks and pages used by the data storage device 120, and 2) the garbage collection process may be integrated so as to more efficiently write application data and improve the efficiency of writing valid data to new memory locations as part of the garbage collection process. These two processes may be integrated in which application data may be used as a first source of data for the data buffer(s) 160 and garbage-collected data (valid data from erase units selected for garbage collection) may be used as a second source of data for the data buffers 160 so as to improve write efficiency.

Figure 2:
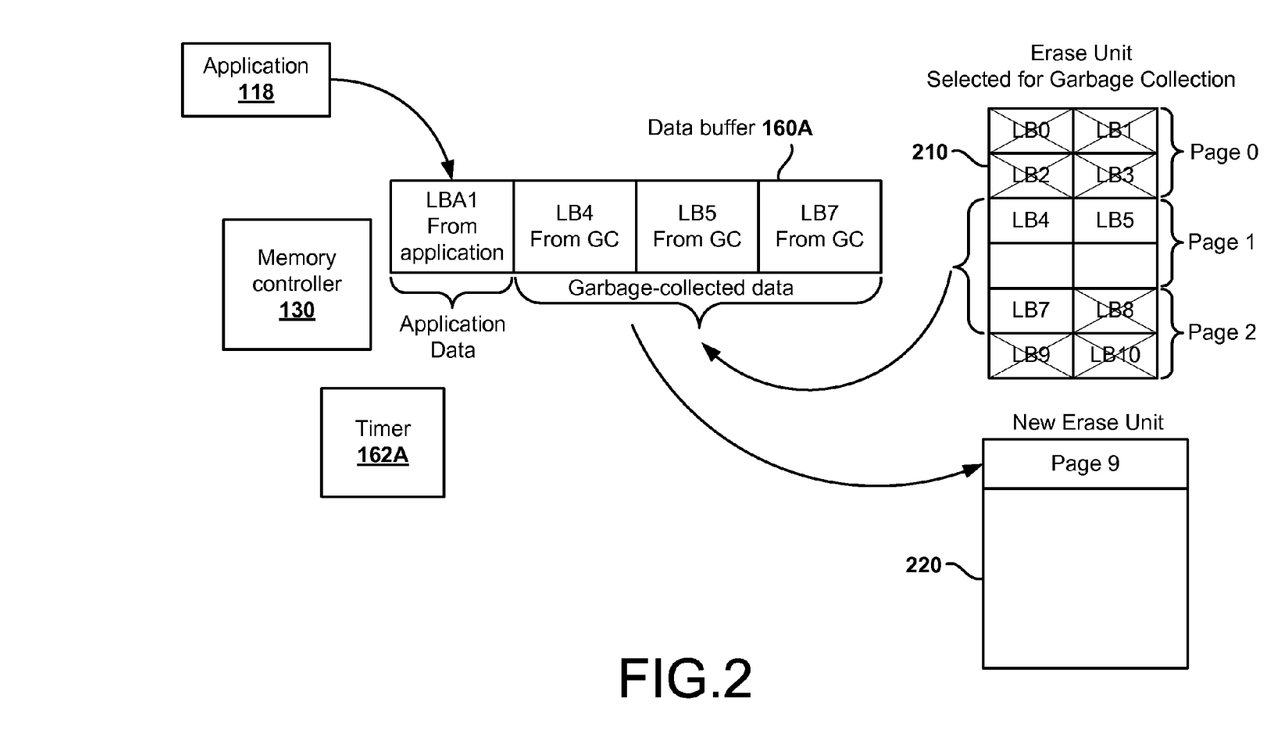
FIG. 2 is a block diagram illustrating an integration of data buffers and the garbage collection process in accordance with an example implementation

FIG. 2 is a diagram illustrating an integration of data buffers and the garbage collection process according to an example implementation in which the data buffers receive application data as a first source of data and garbage-collected data as a second source of data. In this example, each erase unit in data storage device 120 may be 2-4 MB, for example. Each erase unit may include hundreds or thousands of pages, for example, where a page may be 16 KB, for example. Each page may include multiple logical blocks. For example, a page (e.g., 16 KB) may include four 4 KB logical blocks. The garbage collection process (performed or controlled by garbage collection engine 116, FIG. 1) may track the status (e.g., free, valid, invalid) of each logical block in data storage device 120 by maintaining a status map that lists the status of each logical block. One or more data buffers 160, such as data buffer 160A, are provided to receive and store data. In this illustrative example, one or more of the data buffers 160 may be the same size as the page size, e.g., 16 KB in this example. Therefore, each data buffer 160 may store four logical blocks, according to this illustrative example.

An application 118 may write one or more logical blocks by providing a memory write command and the logical block to memory controller 130. Memory controller 130 may perform a logical write operation by writing the logical block (LBA1) to data buffer 160A. Upon writing the logical block to data buffer 160A, memory controller 130 initializes and starts timer 162A associated with data buffer 160A. For example, the timer 162A may be initialized to a time value between 100 ms-800 ms. These are merely examples and other time values may be used for timer 162A.

In the background, garbage collection control engine 116 (FIG. 1) may track the number of valid and invalid logical blocks in each erase unit of data storage device 120. Garbage collection control engine 116 may select erase unit 210 for garbage collection, since, for example, more than X logical blocks have been marked as invalid within erase unit 210. Several logical blocks are shown within erase unit 210, with an X over a logical block indicating that the logical block is invalid. A logical block (LB) number for the logical block without an X means the logical block is valid. An empty logical block within erase unit 210 shown in FIG. 2 means that the logical block is free, according to this example. In the example erase unit 210, logical blocks LB0, LB1, LB2, LB3, LBB, LB9 and LB10 are invalid, while logical blocks LB4, LB5, and LB7 are valid. As an example, page 0 of erase unit 210 may include four logical blocks, including LB0, LB1, LB2 and LB3. Only a small portion of the logical blocks present within erase unit 210 are shown in FIG. 2.

In this example, after logical block LBA1 is written to data buffer 160A based on data received from application 118, no further data is received from application 118 or written to buffer 160A before timer 162A expires. Once timer 162A expires, memory controller 130 copies or writes valid logical blocks LB4, LB5 and LB7, as garbage collected data, from erase unit 210 to data buffer 160A, as shown in FIG. 2. Memory controller 130 may receive write requests from garbage collection control engine 116 and may process these requests when one or more timers 162 expire, or at other times when garbage-collected data may be written to data buffers 160. Writing LB4, LB5 and LB7 to data buffer 160A fills data buffer 160A with four logical blocks, including one logical block (LBA1) from application 118 and three logical blocks (LB4, LB5, LB7) that are garbage-collected data. Garbage collection control engine 116 may then mark these logical blocks LB4, LB5 and LB7 as invalid within erase unit 210. Note that logical blocks LB4, LB5 and LB7 written to the data buffer 160A are considered to be garbage-collected data since these logical blocks are written to the data buffer 160A to facilitate garbage collection by moving these valid logical blocks and thereby allowing the erase unit 210 to be erased. In this manner, write operations for garbage collection may be performed opportunistically via buffers 160, e.g., whenever there is space in one or more buffers 160 for garbage-collected data.

According to an example implementation, a variable portion of each buffer 160 may be allocated or reserved for application data and a variable portion of each buffer may be allocated or reserved for garbage-collected data. The portion of each buffer allocated or reserved for each of these two different data sources (application data, garbage-collected data) may be adjusted to accommodate the specific needs or demands for garbage collection and/or the needs for write processing from applications. For example, a variable portion of each buffer 160 may be allocated between application data and garbage collected data, e.g., based on the number of free erase units available, and/or based on the number or rate of write requests that are received from application(s) 118. For example, a number of logical blocks in a data buffer 160 that is allocated or reserved to the application 118 may be increased based on demand from the application, e.g, based on a number of write requests from application(s) 118. On the other hand, the number of logical blocks in the data buffer 160 allocated or reserved for garbage-collected data may be increased as the number of free erase units decreases, so as to increase the amount of garbage-collected data that is written to data storage device.

According to one example implementation, initially, memory controller 130 does not reserve any portions of each buffer 160 for either application data or garbage-collected data. Thus, initially, both streams of data may have access to buffers 160 without limitation, even if some buffers may be all application data. As noted, according to one example implementation, garbage-collected data may be written to data buffer 160 after expiration of a timer 162, e.g., after some application data has been written to buffer 160.

Garbage collection control engine 116 may monitor the number of free (erased) erase units within data storage device. In some cases, if there is a significant amount of write requests from application(s) 118 to buffer 160, then there may be few, if any, opportunities for garbage-collected data to access buffers 160, since a timer 162 may not typically expire with a non-full buffer if there are more write requests from applications 118 than can be handled by memory controller 130, for example. Therefore, it may be useful to provide a variable number of logical blocks (or buffer portions) in each buffer that are reserved for garbage-collected data, e.g., depending on the number of free erase units.

In an example implementation, if a number of free (erased) erase units within data storage device 120 falls below a threshold, then garbage-collection control engine 116 may adjust the reserved buffer portions of each buffer to reserve, for example, at least one logical block (or, for example, one portion, among four total portions, or ¼ of the buffer) of each buffer 160 to garbage collection (reserved for garbage-collected data). This, for example, may require a minimum of one logical block to be reserved for garbage-collected data for each data buffer 160 to ensure that each buffer write to data storage device 120 would facilitate at least some garbage collection by writing one logical block of garbage-collected data. According to an example implementation, garbage-collected data would be written to the data buffer 160 whenever a timer expires, or whenever the non-reserved logical blocks have been filled by the application data, whichever occurs first. Alternatively, garbage-collected data could be written to all of the reserved logical blocks of a data buffer 160 before application data may be written to the buffer 160. Thus, in such case, each data buffer 160 (or at least some of the data buffers 160) may not be written to the data storage device 120 until the buffer includes at least one logical block of garbage-collected data. A similar approach may be used for reserving additional amounts of data (e.g., reserving additional logical blocks) of data buffer 160.

If the number of free erase units drops below a second threshold (e.g., lower than the first threshold), then the number of logical blocks in each buffer reserved for garbage-collected data may be increased to two logical blocks for each buffer 160, e.g., wherein ½ of each buffer is reserved for garbage-collected data. In such case, each buffer 160 may not be written to data storage device 120 until the data buffer includes at least two logical blocks of garbage-collected data. If the number of free erase units drops below a third threshold (e.g., lower than the second threshold), then the number of logical blocks in each buffer reserved for garbage-collected data may be increased to three logical blocks, e.g., wherein ¾ of each buffer may be reserved for garbage-collected data.

Finally, according to this illustrative example, if the number of free erase units drops below a fourth threshold, then the number of logical blocks (or buffer portions) reserved for garbage-collected data may be increased to four logical blocks so that the entire buffer is reserved for garbage-collected data, for example. This would, at least temporarily, shut off applications from being able to perform write operations to data storage device 120.

Another example implementation may involve providing the data buffers with an initial reservation for garbage-collected data (e.g., one logical block for garbage-collected data), and allowing an increase in the reserved logical blocks for garbage-collected data up to three reserved logical blocks, based on the thresholds noted above. This would allow both applications 118 and garbage-collected data to each access at least one logical block of each buffer, e.g., so that both application data and the garbage collection process continue to make progress by being able to write to data storage device 120.

When the number of free erase units increases above each of the noted thresholds, then the amount of data in the data buffer reserved for garbage-collected data may be iteratively decreased again, which would allow the applications 118 to write to an increasing number of logical blocks of each data buffer 160 as the number of free erase units increases.

Alternatively, rather than reserving data for garbage collection only within each data buffer, an amount of data within each data buffer 160 may be reserved for both application data and garbage-collected data. For example, a first number of logical blocks, such as two logical blocks for example (or a first amount of data, e.g., 8 KB) may be reserved in each data buffer 160 for application data, and a second number of logical blocks, such as two logical blocks (or a second amount of data, e.g., 8 KB) may be reserved for garbage-collected data. These reserved amounts may be varied based on various criteria, such as based on a number of free erase units, for example.

In another example implementation, each application 118 may have an associated timer 162, e.g., so that a different timer value may be used for each application. Some applications may be very intolerant to loss of data, such as a banking application. For such a loss-intolerant application, a low timer value may be used, e.g., 100 ms, so as to reduce the risk of loss of data that is stored in the data buffers 160 for such application before the data is written to data storage device 120. On the other hand, other types of applications may be able to tolerate some loss of data without a significant problem. For example, a Voice over IP (VoIP) application may typically be able to handle a loss of some data or some dropped packets, while continuing to operate. Therefore, for such an application that is more tolerant to possible loss of data, a higher timer value may be selected, e.g., 500 ms.

In another example implementation, an application may issue or send a flush command (or flush request). A flush request may be sent by an application to request the host computing device and/or the data storage device to immediately write any data stored in one or more data buffers that are storing data written by the requesting application. Therefore, in response to the flush request, the timer associated with one or more data buffers storing data from the requesting application may be immediately expired. Similar to operation noted above, when a timer for this data buffer expires, remaining space in the data buffer may be filled with garbage-collected data. Then, the full data buffer may be written as a page to an erase unit, where the data buffer that is written includes at least one logical block (or logical sector) of application data, and at least one logical block of garbage-collected data.

In addition, whether each timer 162 is associated with each buffer 160, or each timer 162 is associated with an application 118, the timer values may be adjusted to either increase or decrease the (likely) amount of garbage-collected data that will be written to the buffers. For example, a low timer value increases the likelihood that the timer will expire without the associated data buffer 160 being full with application data, thereby increasing the likelihood that the data buffer will be non-full when the timer expries, and allowing garbage-collected data to be written to the buffer. Thus, a low timer value would likely increase the amount of garbage-collected data that may be written to the data buffer, whereas a higher timer value may typically decrease the amount of garbage-collected data that is likely written to the data buffer 160. Therefore, according to another example implementation, a timer value for a buffer may be increased as application write requests increase and/or as a number of free erase units increase, e.g., so as to likely allow more logical blocks to be filled by application data and fewer logical blocks to be filled or be made available with garbage-collected data. On the other hand, the timer value for a buffer may be decreased as application write requests decrease and/or a number of free erase units decrease, e.g., so as to likely allow fewer logical blocks to be filled with application data and/or to allow more logical blocks to be filled or be made available to garbage-collected data.

Figure 3:
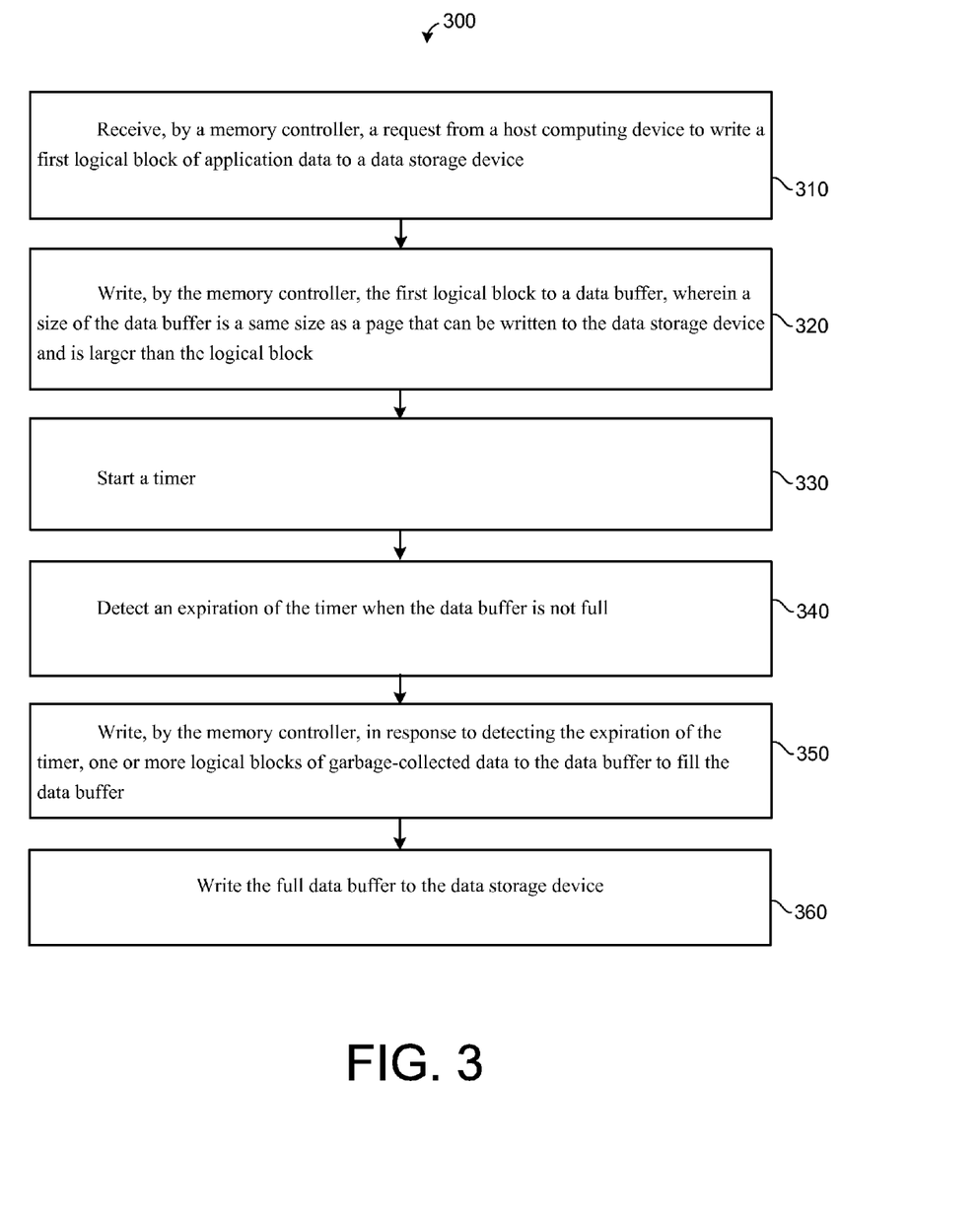
FIG. 3 is an exemplary flow diagram illustrating an exemplary process for improving write efficiency of a data storage device.

FIG. 3 is an exemplary flow diagram illustrating an exemplary process 300 for improving write efficiency on a data storage device. At operation 310, a request is received by a memory controller from a host computing device to write a first logical block of application data to a data storage device. At operation 320, the memory controller writes the first logical block to a data buffer, wherein a size of the data buffer is a same size as a page that can be written to the data storage device and is larger than the logical block. At operation 330, a timer is started, e.g., by the memory controller or host computing device.

With respect to FIG. 3, at operation 340, an expiration of the timer is detected (e.g., by the memory controller or host computing device) when the data buffer is not full. At operation 350, in response to detecting the expiration of the timer, the memory controller writes one or more logical blocks of garbage-collected data to the data buffer to fill the data buffer. In an alternative embodiment, the writing of the garbage-collected data to the data buffer may result in the data buffer becoming only partially full (or less than full). At operation 360, the (e.g., full, or at least partially full) data buffer is written (e.g., by the memory controller) to the data storage device. For example, the data buffer that is written to the data storage device may include at least one logical block of application data and at least one logical block of garbage-collected data.

Figure 4:
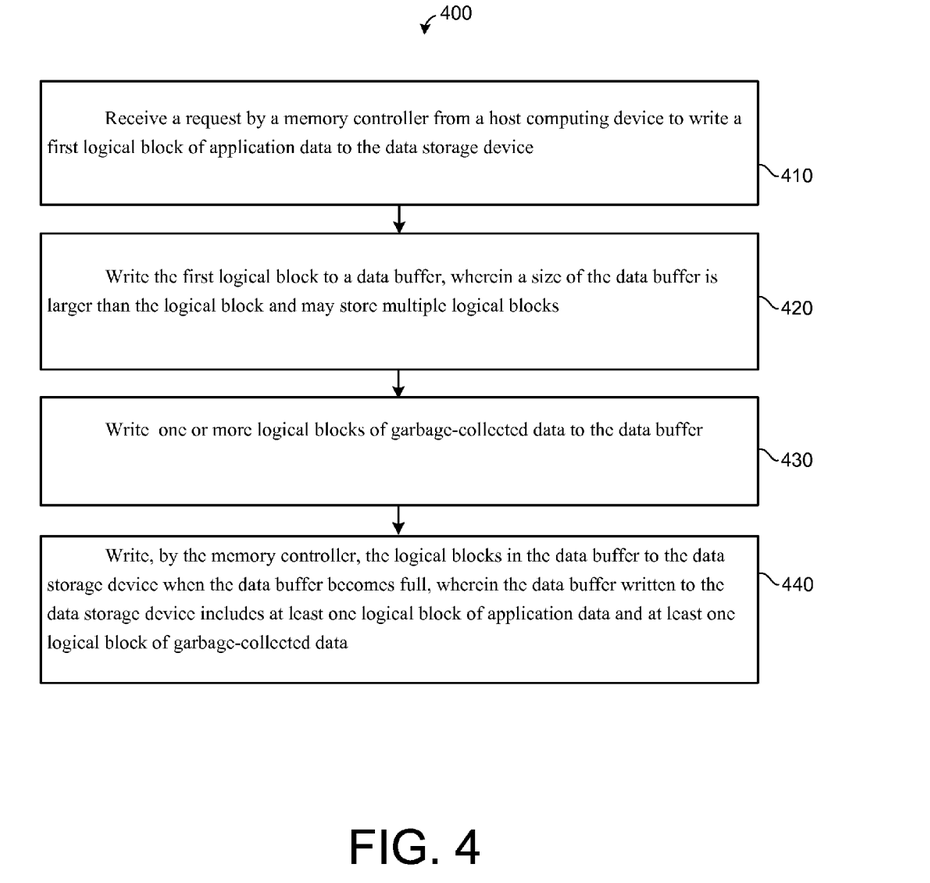
FIG. 4 is an exemplary flow diagram illustrating another exemplary process for improving write efficiency of a data storage device.

FIG. 4 is an exemplary flow diagram illustrating another exemplary process 400 for improving write efficiency of a data storage device. At operation 410, a request is received by a memory controller from a host computing device to write a first logical block of application data to the data storage device. At operation 420, the first logical block is written to a data buffer, wherein a size of the data buffer is larger than the logical block and may store multiple logical blocks. At operation 430, one or more logical blocks of garbage-collected data are written to the data buffer. And, at operation 440, the memory controller writes the logical blocks in the data buffer to the data storage device when the data buffer becomes full. The data buffer written to the data storage device includes at least one logical block of application data and at least one logical block of garbage-collected data.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:
1. A method comprising:
receiving, by a memory controller, a request from a host computing device to write a first logical block of application data to a data storage device;
writing, by the memory controller, the first logical block to a data buffer, wherein a size of the data buffer is a same size as a page that can be written to the data storage device and is larger than the logical block;
starting a timer in response to writing the first logical block to the data buffer;
receiving, by the memory controller, one or more additional requests from the host computing device to write one or more additional logical blocks of application data to the data storage device;
prior to an expiration of the timer, determining that the data buffer is not full;
detecting the expiration of the timer;
writing, by the memory controller, in response to detecting the expiration of the timer and determining that the data buffer is not full, one or more logical blocks of garbage-collected data to the data buffer to fill the data buffer, wherein the garbage-collected data comprises at least one valid logical block of an erase unit of the data storage device that has been selected for garbage collection; and
writing the full data buffer to the data storage device.
2. The method of claim 1 wherein the data buffer includes a plurality of logical blocks and wherein the full data buffer includes at least one logical block of the application data and at least one logical block of garbage-collected data.
3. The method of claim 1 and further comprising:
tracking, by a garbage collection control engine, a number of valid and invalid logical blocks in each of a plurality of erase units of the data storage device; and
selecting one of the erase units for garbage collection based on a number of valid logical blocks and a number of invalid logical blocks within the selected erase unit.
4. The method of claim 1 and further comprising:
determining a number of free erase units within the data storage device;
determining that the number of free erase units is less than a threshold; and
increasing a portion of the data buffer that is reserved for the garbage-collected data based on the determining that the number of free erase units is less than a threshold.
5. The method of claim 1 and further comprising:
determining a number of free erase units within the data storage device;
determining that the number of free erase units is greater than a threshold; and
decreasing a portion of the data buffer that is reserved for the garbage-collected data based on the determining that the number of free erase units is greater than a threshold.
6. The method of claim 1 and further comprising:
determining a number of write requests for application data;
determining that the number of write requests is greater than a threshold; and
decreasing a portion of the data buffer that is reserved for the garbage-collected data based on the determining that the number of write requests is greater than a threshold.
7. The method of claim 1 wherein the receiving comprises receiving, by a memory controller, a request from an application running on a host computing device to write a first logical block of application data to a data storage device;
wherein the timer is associated with the application;
wherein the starting comprises starting the timer associated with the application in response to the writing, by the memory controller, the first logical block of data from the application to a data buffer associated with the timer.
8. The method of claim 1 and further comprising:
adjusting an initial value of the timer as write requests for application data from the host computing device change or a number of free erase units change in order to vary a likely amount of garbage-collected data that will be written to the data buffer.
9. A data storage device, comprising:
a plurality of flash memory devices, each of the flash memory devices being arranged into a plurality of erase units having a plurality of logical blocks for storing data; and
a memory controller operationally coupled with the flash memory devices, the memory controller being configured to:
receive a request from a host computing device to write a first logical block of application data to the data storage device;
write the first logical block to a data buffer, wherein a size of the data buffer is a same size as a page that can be written to the data storage device and is larger than the logical block;
start a timer in response to writing the first logical block to the data buffer;
receive one or more additional requests from the host computing device to write one or more additional logical blocks of application data to the data storage device;
prior to an expiration of the timer, determine that the data buffer is not full;
detect the expiration of the timer;
write, in response to detecting the expiration of the timer and determining that the data buffer is not full, one or more logical blocks of garbage-collected data to the data buffer, wherein the garbage-collected data comprises at least one valid logical block of an erase unit of the data storage device that has been selected for garbage collection; and
write the data buffer to the data storage device.

10. The data storage device of claim 9 wherein the data buffer includes a plurality of logical blocks and wherein the data buffer includes at least one logical block of the application data and at least one logical block of garbage-collected data.

11. The data storage device of claim 9 wherein the memory controller is further configured to:
track a number of valid and invalid logical blocks in each of a plurality of erase units of the data storage device; and
select one of the erase units for garbage collection based on a number of valid logical blocks and a number of invalid logical blocks within the selected erase unit.

12. The data storage device of claim 9 wherein the memory controller is further configured to:
determine a number of free erase units within the data storage device;
determine that the number of free erase units is less than a threshold; and
increase a portion of the data buffer that is reserved for the garbage-collected data based on the determining that the number of free erase units is less than a threshold.

13. The data storage device of claim 9 wherein the memory controller is further configured to:
determine a number of free erase units within the data storage device;
determine that the number of free erase units is greater than a threshold; and
decrease a portion of the data buffer that is reserved for the garbage-collected data based on the determining that the number of free erase units is greater than a threshold.

14. The data storage device of claim 9 wherein the memory controller is further configured to:
determine a number of write requests for application data;
determine that the number of write requests is greater than a threshold; and
decrease a portion of the data buffer that is reserved for the garbage-collected data based on the determining that the number of write requests is greater than a threshold.

15. The data storage device of claim 9 wherein the memory controller being configured to receive comprises the memory controller being configured to receive a request from an application running on a host computing device to write a first logical block of application data to a data storage device;
wherein the memory controller being configured to start comprises the memory controller being configured to start the timer associated with the application in response to the writing the first logical block of data from the application to the data buffer associated with the timer.

16. The data storage device of claim 9 wherein the data buffer that is written to the data storage device comprises a full data buffer that includes at least one logical block of application data and at least one logical block of garbage-collected data.

17. A non-transitory computer-readable storage medium storing instructions that when executed cause a processor to perform a process, the process comprising:
receiving a request from a host computing device to write a first logical block of application data to a data storage device;
writing the first logical block to a data buffer, wherein a size of the data buffer is a same size as a page that can be written to the data storage device and is larger than the logical block;
starting a timer in response to writing the first logical block to the data buffer;
receiving one or more additional requests from the host computing device to write one or more additional logical blocks of application data to the data storage device;
prior to an expiration of the timer, determining that the data buffer is not full;
detecting the expiration of the;
writing, in response to detecting the expiration of the timer and determining that the data buffer is not full, one or more logical blocks of garbage-collected data to the data buffer, wherein the garbage-collected data comprises at least one valid logical block of an erase unit of the data storage device that has been selected for garbage collection; and
writing the data buffer to the data storage device.

18. The computer-readable storage medium of claim 17 wherein the data buffer that is written to the data storage device comprises a full data buffer that includes at least one logical block of application data and at least one logical block of garbage-collected data.

19. The computer-readable storage medium of claim 17 wherein the data buffer includes a plurality of logical blocks and wherein the data buffer that is written to the data storage device is full and includes at least one logical block of the application data and at least one logical block of garbage-collected data.

20. The computer-readable storage medium of claim 17 wherein the process further comprises:
tracking a number of valid and invalid logical blocks in each of a plurality of erase units of the data storage device; and
selecting one of the erase units for garbage collection based on a number of valid logical blocks and a number of invalid logical blocks within the selected erase unit.

21. The computer-readable storage medium of claim 17 wherein the process further comprises:
determining a number of free erase units within the data storage device;
determining that the number of free erase units is less than a threshold; and
increasing a portion of the data buffer that is reserved for the garbage-collected data based on the determining that the number of free erase units is less than a threshold.

22. A data storage device, comprising:
a plurality of flash memory devices, each of the flash memory devices being arranged into a plurality of erase units having a plurality of logical blocks for storing data; and
a memory controller operationally coupled with the flash memory devices, the memory controller being configured to:
receive a request from a host computing device to write a first logical block of application data to the data storage device;
write the first logical block to a data buffer, wherein a size of the data buffer is larger than the logical block and may store multiple logical blocks;
start a timer when the first logical block is written to the data buffer;

write one or more logical blocks of garbage-collected data to the data buffer, wherein the garbage-collected data comprises at least one valid logical block of an erase unit of the data storage device that has been selected for garbage collection;

prior to an expiration of the timer, determine that the data buffer is not full;

detect the expiration of the timer;

in response to detecting the expiration of the timer and determining that the data buffer is not full, write one or more additional logical blocks of garbage-collected data to the data buffer to fill the data buffer; and write the full data buffer to the data storage device.

23. The data storage device of claim 22, wherein at least a portion of the data buffer is reserved for garbage-collected data.

24. The data storage device of claim 23 wherein the portion of the data buffer that is reserved for garbage collection is variable based on a number of free erase units in the data storage device.

25. The data storage device of claim 22, wherein at least a portion of the data buffer is reserved for application or host data.

26. The data storage device of claim 22, wherein:

at least a first portion of the data buffer is reserved for garbage-collected data;

at least a second portion of the data buffer is reserved for application data; and wherein the sizes of the first portion and the second portion are adjusted based on a number of free erase units in the data storage device.

27. A method comprising:

receiving a request by a memory controller from a host computing device to write a first logical block of application data to the data storage device;

writing the first logical block to a data buffer, wherein a size of the data buffer is larger than the logical block and may store multiple logical blocks;

starting a timer when the first logical block is written to the data buffer;

writing one or more logical blocks of garbage-collected data to the data buffer, wherein the garbage-collected data comprises at least one valid logical block of an erase unit of the data storage device that has been selected for garbage collection;

prior to an expiration of the timer, detecting that the data buffer is not full;

detecting the expiration of the timer;

in response to detecting the expiration of the timer and detecting that the data buffer is not full, writing one or more additional logical blocks of garbage-collected data to the data buffer to fill the data buffer; and writing the full data buffer to the data storage device.

* * * * *